United States Patent [19]
Ayresman

[11] Patent Number: 5,979,481
[45] Date of Patent: Nov. 9, 1999

[54] APPARATUS AND METHOD FOR VAPOR REDUCTION FOR A FUEL STORAGE TANK

[76] Inventor: Loren Ayresman, P.O. Box 1950, Pahoa, Hi. 96778

[21] Appl. No.: 09/024,469

[22] Filed: Feb. 17, 1998

[51] Int. Cl.[6] .................................................. G05D 16/00
[52] U.S. Cl. .......................... 137/14; 137/81.1; 220/88.3; 220/721
[58] Field of Search .................... 137/14, 81.1; 220/88.3, 220/721

[56] References Cited

U.S. PATENT DOCUMENTS

| | | | |
|---|---|---|---|
| 2,653,780 | 9/1953 | Pepersack | 220/723 |
| 3,691,730 | 9/1972 | Hickey et al. | 220/88.3 X |
| 3,710,549 | 1/1973 | Nichols et al. | 220/88.3 X |
| 3,732,668 | 5/1973 | Nichols | 220/88.3 X |
| 4,615,455 | 10/1986 | Tansill | 220/721 X |

*Primary Examiner*—Gerald A. Michalsky
*Attorney, Agent, or Firm*—Michael R. McKenna

[57] ABSTRACT

A fuel vapor reduction apparatus comprising an inert gas receiver, pressure sensor of the vacant volume of a fuel storage tank, external pressure sensor, a non-permeable expandable member disposed inside the fuel storage tank, and an inert gas regulator that is responsive to a predetermined differential pressure between the pressure of the vacant volume inside the tank and the external fuel storage tank pressure, whereby, the expandable member is able to expandably receive and hold the inert gas to fill the vacant volume and reduce fuel vapor formation.

19 Claims, 2 Drawing Sheets

APPARATUS AND METHOD FOR VAPOR REDUCTION FOR A FUEL STORAGE TANK

This invention relates to a method and apparatus for reducing fuel vapor for a liquid fuel storage tank having an internal volume including a fuel volume and a vacant volume. In particular this relates to a method and apparatus to reduce the safety hazards arising from a mixture of air and fuel vapor. The dangers of ignition of the air-fuel vapor mixture include fire and explosion.

When fuel tanks are less than full, the volume of the tank not occupied by the fuel is generally filled with air. When flammable fuel comes in contact with air any spark caused by friction or other heat source can ignite the fuel air vapor mixture and turn an otherwise safe storage facility into an explosive one. All combustible gases when mixed with the proper amount of air will burn at a reasonable ambient temperature. A small ignition source, such as a spark, will ignite them, the purpose of the instant invention is to displace the air that normally fills the vacant volume with an expandable member filled with an inert gas to eliminate an explosive mixture.

The explosives and combustion of jet fuel is a particularly problematic concern of the aviation industry. Use of the instant device to reduce air and fuel vapor mixtures, reduce prospects of flammability and explosion, and provide improved safety in the facility or vehicle in which the fuel storage tank is located.

A preferred method of reducing fuel vapor in a fuel storage tank which is taught by this invention comprises:

sensing pressure of the vacant volume and producing an internal pressure signal corresponding to the pressure of the vacant volume;

sensing external fuel storage tank pressure and producing an external pressure signal corresponding to the external fuel storage tank pressure;

containing an inert gas in operable association with the fuel storage tank;

receiving the inert gas by a non-permeable expandable member disposed inside the fuel storage tank, the expandable member being in operable association with the fuel storage tank and the means for receiving an inert gas in a manner so as to be able to expandably receive and hold the inert gas;

regulating the inert gas received and held by the expandable member that is responsive to a predetermined differential pressure between the pressure of the vacant volume and the external fuel storage tank pressure, the means for regulating being operably connected to the means for receiving an inert gas, whereby, the expandable member can be expanded between a substantially relaxed first state and a second state in which the member and the inert gas contained thereby substantially fill the internal volume of the fuel storage tank.

In one mode of operation when an increase in the differential pressure between the pressure of thfe vacant volume and the external fuel storage tank pressure above a predetermined threshold resulting from at least one of an increase in the fuel volume and a decrease in the external fuel tank pressure is sensed, the pressure of the vacant volume is automatically relieved.

In another example of the operation of the instant invention, when a decrease in the differential pressure between the vacant volume and the external fuel storage tank pressure below a predetermined threshold resulting from at least one of a decrease in the fuel volume and an increase in the external fuel storage tank pressure is sensed, inert gas from the means for receiving is directed to the expandable member to occupy the vacant volume and retard combustible vapor formation.

Various types of fuel tank explosion reduction systems currently exist seek to isolate and contain combustible components in a fuel tank. However, none of the following patents teaches a method or apparatus that is responsive to a predetermined differential pressure between the pressure of the vacant volume and the external fuel storage tank pressure, whereby, an expandable member can be expanded between a substantially relaxed first state and a second state in which the member and the inert gas contained thereby substantially fill the internal volume of the fuel storage tank. Nor do the patents discussed disclose a method or apparatus that automatically relieves the pressure of the vacant volume when at least one of an increase in the fuel volume and a decrease in the external fuel tank pressure is sensed.

Capillary fuel storage within fuels tanks is provided in U.S. Pat. No. 4,676,463 issued in 1987 to Tansill. Said capillaries confine the fuel and reduce the likelihood of explosive ignition.

U.S. Pat. No. 4,615,455 issued in 1986 to Tansill discloses an explosion resistant fuel tank device comprising an explosion resistant insert, and a means for compressing the insert comprising an inflatable bag inside the tank which is inflatable through a gas inlet. The insert is a compressible structure comprising a plurality of cells for containing liquid fuel, like a sponge. The inflatable bag's only function is as a means to force fuel out of the sponge. Unlike the instant invention, the Tansill device uses a pressure biasing means for creating a pressure differential between the inflatable bag and the fuel outlet 21. In the instant invention the important pressure differentials are between the vacant volume and the external ambient pressure.

Furthermore, one of the drawbacks to the Tansill design is the requirement of the sponge which is not required in the instant invention. Moreover, the instant invention is readily adaptable to situations subjecting the fuel storage tank to variations in external tank pressure, that is, when the tank is used as a storage reservoir for air transport.

U.S. Pat. No. 4,886,225 issued to Bates in 1989 for an inflatable fuel tank buffer comprises an inflatable bladder disposed between the wall of an aircraft inlet duct and the liquid fuel to reduce hydrodynamic ram effects from a projectile penetrating the fuel tank. Unlike the instant invention, the Bates tank buffer contains liquid fuel separating it from contact with the tank.

U.S. Pat. No. 4,715,417 issued to Coloney in 1987 for an aircraft fuel tank provides a plurality of exterior mounted inflatable tubular ribs and a means for inflating the inflatable ribs.

The citation of the foregoing publications is not an admission that any particular publication constitutes prior art, or that any publication alone or in conjunction with others, renders unpatentable any pending claim of the present application. None of the cited publications is believed to detract from the patentability of the claimed invention.

ADVANTAGES OF THIS INVENTION

As the user of this apparatus and method of reducing fuel vapor in a fuel storage tank will appreciate what is taught by this invention comprises means and methods to safely respond to an increase in the differential pressure between the pressure of the vacant volume and the external fuel storage tank pressure above a first predetermined threshold resulting from at least one of an increase in the fuel volume and a decrease in the external fuel tank pressure is sensed, whereby the pressure of the vacant volume is automatically relieved. Moreover, in another example of the operation of the instant invention, when a decrease in the differential pressure between the vacant volume and the external fuel storage tank pressure below a second predetermined threshold resulting from at least one of a decrease in the fuel volume and an increase in the external fuel storage tank pressure is sensed, inert gas from the means for receiving is directed to the expandable member to occupy the vacant volume and retard combustible vapor formation. These advantageous safety operations are neither taught nor suggested by the prior art.

Still other advantages will be apparent from the disclosure that follows.

SUMMARY OF THE INVENTION

The invention relates to a fuel vapor reduction apparatus, for a fuel storage tank having an internal volume substantially including a fuel volume and a vacant volume. The present invention discloses a means for receiving an inert gas in operable association with the fuel storage tank, means for sensing pressure of the vacant volume and producing an internal pressure signal corresponding to the pressure of the vacant volume, and means for sensing external fuel storage tank pressure and producing an external pressure signal corresponding to the external fuel storage tank pressure, at least one non-permeable expandable member disposed inside the fuel storage tank. The expandable member is in operable association with the fuel storage tank and the means for receiving an inert gas in a manner so as to be able to expandably receive and hold the inert gas.

The fuel vapor reduction apparatus further comprises means for regulating the inert gas received anc held by the expandable member that is responsive to a predetermined differential pressure between the pressure of the vacant volume and the external fuel storage tank pressure.

A preferred method of reducing fuel vapor in a fuel storage tank, having an internal volume substantially including a fuel volume and a vacant volume, which comprises sensing an increase in the differential pressure between the pressure of the vacant volume and the external fuel storage tank pressure above a first predetermined threshold resulting from at least one of an increase in the fuel volume and a decrease in the external fuel tank pressure, and relieving pressure of the vacant volume.

Another preferred method of reducing fuel vapor in a fuel storage tank, having an internal volume substantially including a fuel volume and a vacant volume, which comprises sensing a decrease in the differential pressure between the vacant volume and the external fuel storage tank pressure below a second predetermined threshold resulting from at least one of a decrease in the fuel volume and an increase in the external fuel storage tank pressure, and allowing inert gas from the means for receiving to be directed to the expandable member.

BRIEF DESCRIPTION OF THE DRAWINGS

Preferred embodiments of the invention are described hereinafter with reference to the accompanying drawing wherein.

DETAILED DESCRIPTION OF THE INVENTION

Figure 1:
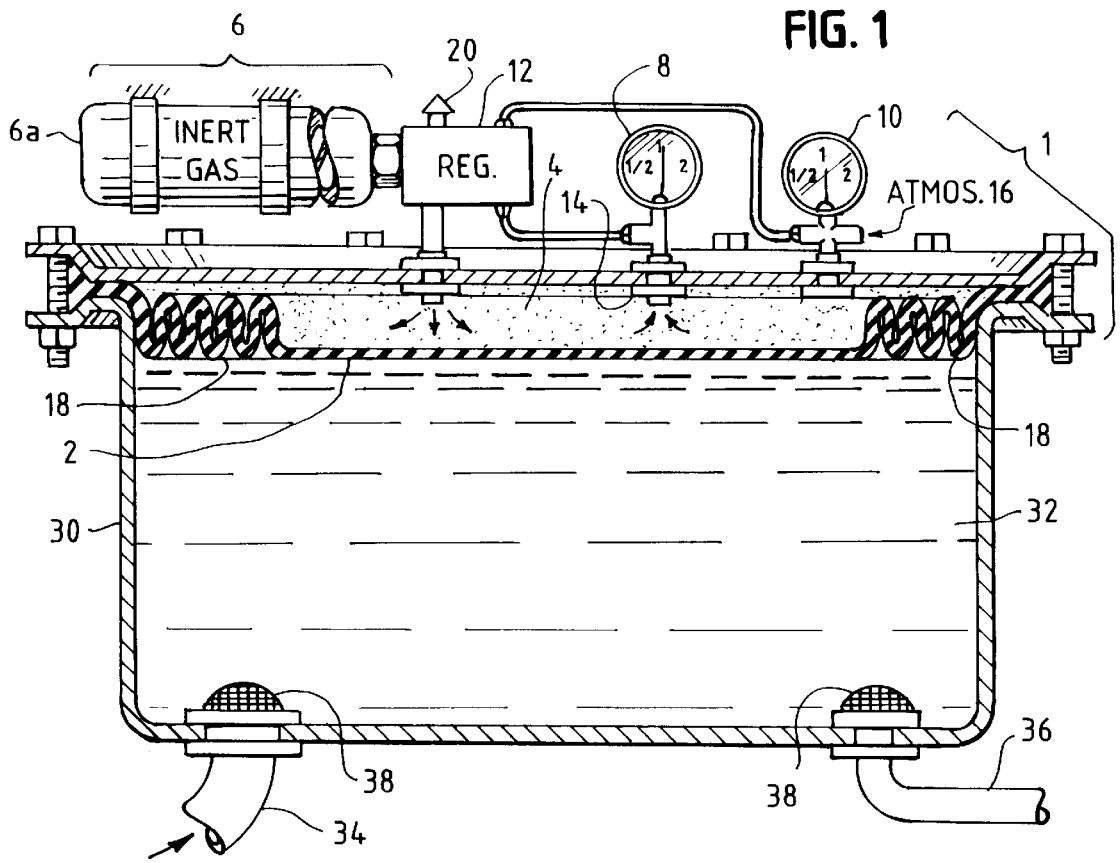
FIG. 1 is a side elevation view of a first preferred embodiment of the fuel vapor reduction apparatus of the present invention showing a fuel tank having an internal volume substantially including a fuel volume and a vacant volume, said apparatus comprising means for receiving an inert gas, means for sensing pressure of the vacant volume, means for sensing external fuel storage tank pressure, and a non-permeable expandable member disposed inside the storage tank, shown in a relaxed first state.

The preferred embodiments depicted in the drawing include a means for receiving an inert gas in operable association with the fuel storage tank, means for sensing pressure of the vacant volume, and means for sensing external fuel storage tank pressure, a non-permeable expandable member disposed inside the fuel storage tank. The fuel vapor reduction apparatus further comprises means for regulating the inert gas received and held by the expandable member that is responsive to a predetermined differential pressure between the pressure of the vacant volume and the external fuel storage tank pressure. Without departing from the generality of the invention disclosed herein could be further developed to employ a means for compressing the discharged inert gas and reintroducing it into the means for containing the inert gas.

The discussion that follows, without limiting the scope of the invention, will refer to the invention as depicted in the drawing.

The preferred embodiments of the apparatus depicted in the drawing comprise a fuel vapor reduction apparatus 1, for a fuel storage tank 30 for storing fuel 32 having a fuel inlet 34 and a fuel outlet 36, and an internal volume substantially including a fuel volume and a vacant volume, is disclosed which comprises means for receiving 6 an inert gas 4 in operable association with the fuel storage tank, means for sensing pressure of the vacant volume 8 and producing an internal pressure signal corresponding to the pressure of the vacant volume, and means for sensing external fuel storage tank pressure 10 and producing an external pressure signal corresponding to the external fuel storage tank pressure, at least one non-permeable expandable member 2 disposed inside the fuel storage tank 30. The means for receiving 6 may include a connector for the gas supply, a storage container, such as a gas cylinder 6a shown in the drawing, or a supply line. The expandable member 2, which may include a sheet-like member or a bladder 2a, is in operable association with the fuel storage tank 30 and the means for receiving 6 an inert gas 4 in a manner so as to be able to expandably receive and hold the inert gas 4.

The fuel vapor reduction apparatus further comprises means for regulating 12 the inert gas received and held by the expandable member 2 that is responsive to at. least one of the internal pressure signal and the external pressure signal. The means for regulating 12 is further operably connected to the means for receiving 6 an inert gas 4. In operation the expandable member 2 may be reversibly expanded between a substantially relaxed first state, as shown in FIG. 1, and a second state, shown in FIG. 2, in which the member and the inert gas contained thereby substantially fill the internal volume of the fuel storage tank.

Another embodiment of the fuel vapor reduction apparatus of this important invention includes means for receiving 6 an inert gas 4 in operable association with the fuel storage tank 30, means for sensing pressure of the vacant volume 8 and producing an internal pressure signal corresponding to the pressure of the vacant volume, means for sensing external fuel storage tank pressure 10 and producing an external pressure signal corresponding to the external fuel storage tank pressure, and at least one non-permeable expandable member 2 disposed inside the fuel storage tank 30. The expandable member 2 is in operable association with the fuel storage tank 30 and the means for receiving 6 an inert gas 4 in a manner so as to be able to expandably receive and hold the inert gas 4. Means for regulating 12 the inert gas 4 received and held by the expandable member 2 that is responsive to a predetermined differential pressure between the pressure of the vacant volume and the external fuel storage tank pressure is further provided. The means for regulating 12 is operably connected to the means for receiving 6 an inert gas 4. In operation, the expandable member 2 may be reversibly expanded between a substantially relaxed first state and a second state in which the member arid the inert gas contained thereby substantially fill the internal volume of the fuel storage tank. It will be found that the pressure necessary in the expandable member to reduce the intrusion of air into the tank that will be only slightly greater than the ambient pressure existing outside of the tank.

In an embodiment of the fuel vapor reduction apparatus, as shown in FIG. 1, the means for receiving 6 inert gas 4 comprises a gas cylinder 6*a*.

Figure 2:
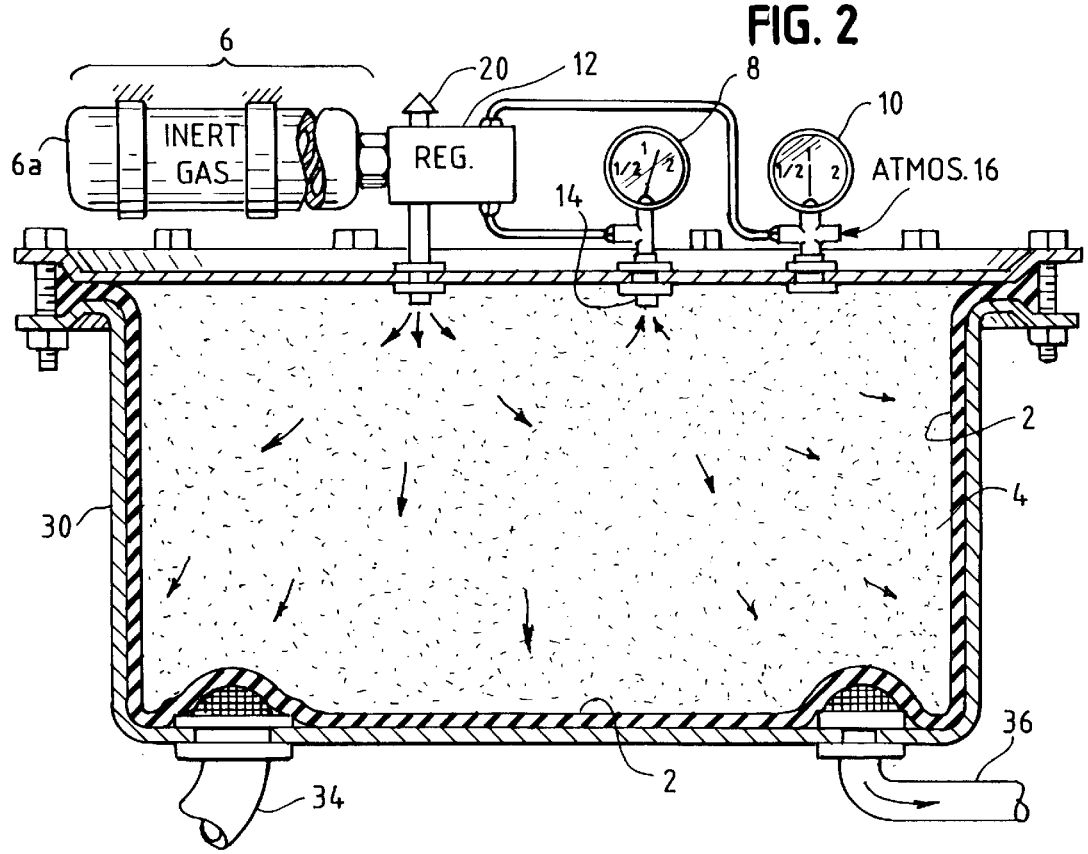
FIG. 2 is a elevated side of the fuel vapor reduction apparatus of FIG. 1 showing the expandable member in a second state in which the member and the inert gas contained thereby substantially fill the internal volume of the fuel storage tank.

As best shown in FIG. 2, the means for sensing the pressure of the vacant volume 8 and producing an internal pressure signal comprises an internal pressure sensor 14 operably disposed adjacent to the vacant volume of the fuel storage tank. Moreover, the means for sensing external fuel storage tank pressure 10 may comprise an external pressure sensor 16 disposed outside of the fuel storage tank.

Figure 3:
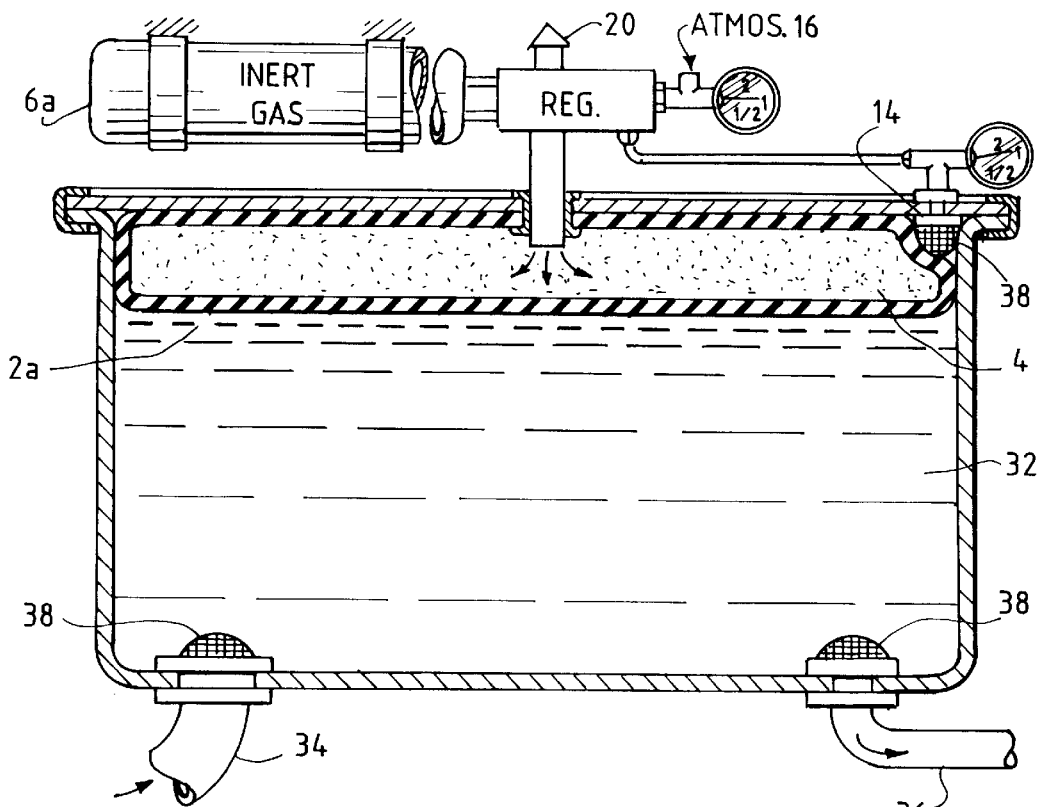
FIG. 3 is a side elevation view of the fuel vapor reduction apparatus where the expandable member is an inflatable bladder and where a majority of the internal volume is comprised of fuel volume, and where the bladder with the inert gas contained therein substantially fills the vacant volume of the fuel tank.
Figure 4:
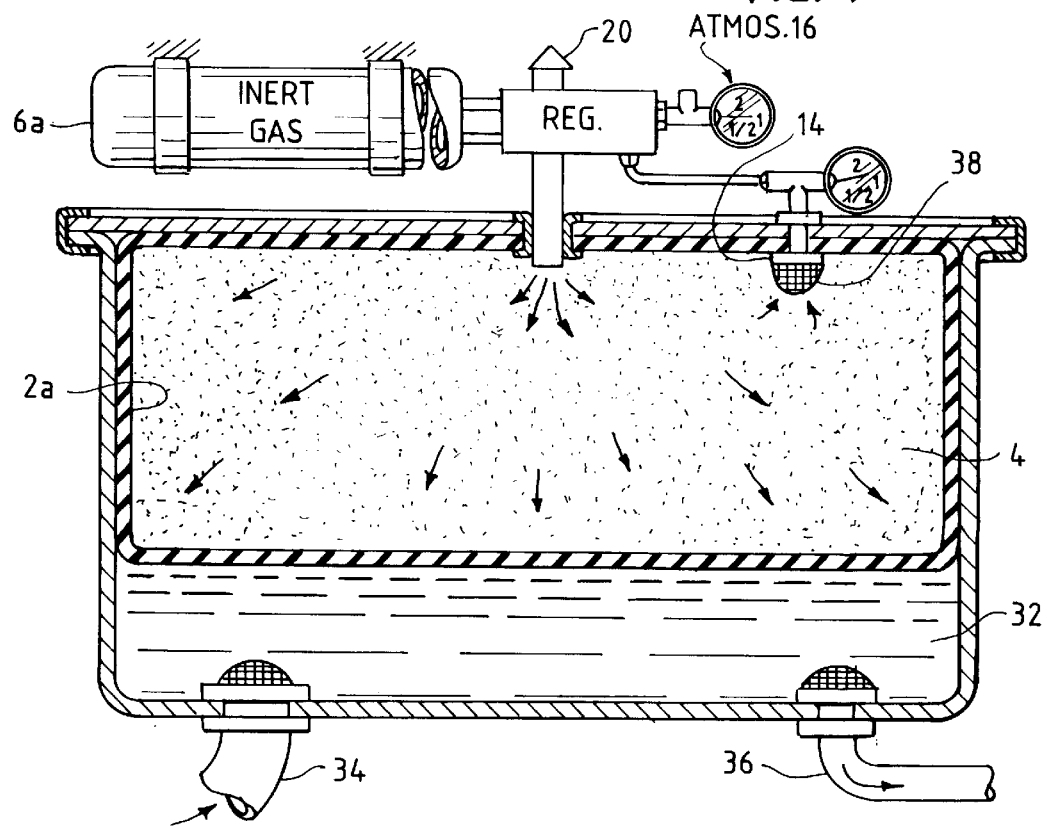
FIG. 4 is a side elevation view of the fuel vapor reduction apparatus with the vacant volume occupying a majority of the internal volume of the fuel storage tank, with the inflatable bladder partially expanded to fill the vacant volume, and with the means for sensing pressure of the vacant volume disposed within the disposable bladder.

In the embodiment of the fuel vapor reduction apparatus of the present invention, as shown in FIGS. 3 and 4, the expandable member 2 comprises an inflatable bladder 2*a*. The inflatable bladder is non-permeable to gas and sufficiently resilient to return to the relaxed first state when not subjected to an internal gas pressure exceeding atmospheric pressure plus a predetermined elastic pressure corresponding to the elastic resistance of the bladder material. The expandable member can be constructed of a thin flexible layer of rubber or rubberized fabric which is appropriately sealed so as to create an impermeable membrane. A variety of commercially available rubberized materials are available. The expandable member may further comprise a plurality of bellows 18 as shown in FIG. 1.

The inert gas 4 may include gases such as nitrogen or helium. Other suitable compounds may be used to displace oxygen rich ambient air which would be supportive of combustion.

Referring to FIGS. 1–4, the fuel vapor reduction apparatus for a fuel storage tank of the present invention may also provide that the means for regulating 12 comprises means for relieving pressure 20 of the vacant volume. The inert gas 4 passing through the means for relieving pressure 20 may be discharged to the atmosphere external to the fuel storage tank 30. Alternatively, the means for relieving pressure 20 of the vacant volume may include means for compressing the discharged inert gas and reintroducing it into the means for containing the inert gas. The means for relieving pressure of the vacant volume is preferably responsive to the internal pressure signal and the external pressure signal, in such a way that an increase in the differential pressure between the pressure of the vacant volume and the external fuel storage tank pressure above a first predetermined threshold resulting from an increase in the fuel volume actuates the means for relieving pressure of the vacant volume. The threshold may be conveniently established to reduce system cycling.

In a preferred embodiment of the fuel vapor reduction apparatus for a fuel storage tank, the means for relieving pressure 20 of the vacant volume is responsive t-o the internal pressure signal and the external pressure signal, in such a way that an increase in the differential pressure between the pressure of the vacant volume and the external fuel storage tank pressure above a first predetermined threshold resulting from a decrease in the external fuel tank pressure actuates the means for relieving pressure of the vacant volume.

In another mode of operation of the fuel vapor reduction apparatus, the means for regulating 12 allows inert gas from the means for receiving 6 to be directed to the expandable member 2 when the differential pressure between the vacant volume and the external fuel storage tank pressure exceeds a predetermined threshold below the predetermined differential pressure between the vacant volume and the external fuel storage tank pressure.

A decrease in the fuel volume creates a corresponding increase in the vacant volume and a reduced vacant volume pressure which is sensed triggering an internal pressure signal to the means for regulating allowing inert gas to be received and held by the expandable member to expandably fill the vacant volume of the fuel storage tank.

Furthermore, the means for regulating 12 may be made responsive to the internal pressure signal and the external pressure signal, whereby, a decrease in the predetermined differential pressure between the vacant volume and the external fuel storage tank pressure below a second predetermined threshold resulting from a decrease in the fuel volume actuates the means for regulating 1.7 allowing inert gas 4 from the means for receiving 6 to be directed to the expandable member 2. Moreover, a decrease in the predetermined differential pressure between the vacant volume and the external fuel storage tank pressure below a second predetermined threshold resulting from an increase in the external fuel storage tank pressure actuates the means for regulating allowing inert gas from the means for receiving to be directed to the expandable member.

The means for regulating comprises a pressure actuator in operative association with and responsive to the external pressure signal.

A preferred method of reducing fuel vapor in a fuel storage tank, having an internal volume substantially including a fuel volume and a vacant volume, which comprises:

sensing pressure of the vacant volume and producing an internal pressure signal.;

sensing external fuel storage tank pressure and producing an external pressure signal;

receiving an inert gas by a non-permeable expandable member disposed inside the fuel storage tank and expanding the expandable member in a manner so as to be able to expandably receive and hold the inert gas; and regulating the inert gas received and held by the expandable member in response to at least one of the internal pressure signal and the external pressure signal, whereby, thie expandable member may be expanded between a substantially relaxed first state and a second state in which the member and the inert gas contained thereby substantially fill the internal volume of the fuel storage tank.

The above method of reducing fuel vapor may further comprise containing an inert gas in operable association with the fuel storage tank.

Another preferred method of reducing fuel vapor in a fuel storage tank, having an internal volume substantially including a fuel volume and a vacant volume, which comprises:

sensing pressure of the vacant volume and producing an internal pressure signal corresponding to the pressure of the vacant volume;

sensing external fuel storage tank pressure and producing an external pressure signal corresponding to the external fuel storage tank pressure;

containing an inert gas in operable association with the fuel storage tank;

receiving the inert gas by a non-permeable expandable member disposed inside the fuel storage tank, the expandable member being in operable association with the fuel storage tank and the means for receiving an inert gas in a manner so as to be able to expandably receive and hold the inert gas;

regulating the inert gas received and held by the expandable member that is responsive to a predetermined differential pressure between the pressure of the vacant volume and the external fuel storage tank pressure, the means for regulating being operably connected to the means for receiving an inert gas, whereby, the expandable member can be expanded between a substantially relaxed first state and. a second state in which the member and the inert gas contained thereby substantially fill the internal volume of the fuel storage tank.

A preferred method of reducing fuel vapor in a fuel storage tank, having an internal volume substantially including a fuel volume and a vacant volume, whiLch comprises sensing an increase in the differential pressure between the pressure of the vacant volume and the external fuel storage tank pressure above a second predetermined threshold resulting from at least one of an increase in the fuel volume and a decrease in the external fuel tank pressure, and relieving pressure of the vacant volume.

Another preferred method of reducing fuel vapor in a fuel storage tank, having an internal volume substantially including a fuel volume and a vacant volume, which comprises sensing a decrease in the differential pressure between the vacant volume and the external fuel storage tank pressure below a second predetermined threshold resulting from at least one of a decrease in the fuel volume and an increase in the external fuel storage tank pressure, and allowing inert gas from the means for receiving to be directed to the expandable member.

While this invention has been described in connection with the best mode presently contemplated by the inventor for carrying out his invention, the preferred embodiments described and shown are for purposes of illustration only, and are not to be construed as constituting any limitations of the invention. Modifications will be obvious to those skilled in the art, and all modifications that do not depart from the spirit of the invention are intended to be included within the scope of the appended claims. Those skilled in the art will appreciate that the conception upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing is to enable the U.S. patent and Trademark Office and the public generally, and especially the scientist, engineers and practitioners in the art who are not familiar with patent or legal terms of phraseology, to determine quickly from a cursory inspection the nature and essence of the technical disclosure of the application. The abstract is neither intended to define the invention of the application, which is measured by the claims, nor is it intended to be limiting as to the scope of the invention in any way.

These together with other objects of the invention, along with the various features of novelty which characterize the invention are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. A fuel vapor reduction apparatus, for a fuel storage tank having an internal volume substantially including a fuel volume and a vacant volume, which comprises:

a. means for receiving an inert gas in operable association with the fuel storage tank;

b. means for sensing pressure of the vacant volume and producing an internal pressure signal corresponding to the pressure of the vacant volume;

c. means for sensing external fuel storage tank pressure and producing an external pressure signal corresponding to the external fuel storage tank pressure;

d. a non-permeable expandable member disposed inside said fuel storage tank between a fuel in the fuel volume and the vacant volume, said expandable member being in operable association with the fuel storage tank and the means for receiving an inert gas in a manner so as to be able to expandably receive and hold the inert gas; and e. means for regulating the inert gas received and held by the expandable member that is responsive to at least one of the internal pressure signal by relieving internal pressure corresponding to the internal pressure signal evidencing increases in the internal pressure and by allowing the inert gas to expand the expandable member corresponding to the internal pressure signal evidencing decreases in the internal pressure, and the external pressure signal by relieving internal pressure corresponding to the external pressure signal evidencing decreases in the external pressure and by allowing the inert gas to expand the expandable member corresponding to the external pressure signal evidencing increases in the external pressure, said means for regulating being operably connected to the means for receiving an inert gas, whereby, said expandable member can be reversibly expanded between a substantially relaxed first state and a second state in which the member and the inert gas contained thereby substantially fill the internal volume of the fuel storage tank.

2. The fuel vapor reduction apparatus for a fuel storage tank of claim 1 wherein the means for receiving inert gas comprises a gas cylinder.

3. The fuel vapor reduction apparatus for a fuel storage tank of claim 1 wherein the means for sensing the pressure of the vacant volume and producing an internal pressure signal comprises a pressure sensor operably disposed adjacent to the vacant volume of the fuel storage tank.

4. The fuel vapor reduction apparatus for a fuel storage tank of claim 1 wherein the means for sensing external fuel storage tank pressure comprises a pressure sensor disposed outside of the fuel storage tank.

5. The fuel vapor reduction apparatus for a fuel storage tank of claim 1 wherein the expandable member comprises an inflatable bladder.

6. The fuel vapor reduction apparatus for a fuel storage tank of claim 1 wherein the expandable member comprises a plurality of bellows.

7. A fuel vapor reduction apparatus, for a fuel storage tank having an internal volume substantially including a fuel volume and a vacant volume, which comprises:

a. means for receiving an inert gas in operable association with the fuel storage tank;

b. means for sensing pressure of the vacant volume and producing an internal pressure signal corresponding to the pressure of the vacant volume;

c. means for sensing external fuel storage tank pressure and producing an external pressure signal corresponding to the external fuel storage tank pressure;

d. a non-permeable expandable member disposed inside said fuel storage tank between a fuel in the fuel volume and the vacant volume, said expandable member being in operable association with the fuel storage tank and the means for receiving an inert gas in a manner so as to be able to expandably receive and hold the inert gas;

e. means for regulating the inert gas received and held by the expandable member that is responsive to a predetermined differential pressure between the pressure of the vacant volume and the external fuel storage tank pressure, by relieving internal pressure corresponding to the differential pressure evidencing increases in the internal pressure relative to the external fuel storage tank pressure and by allowing the inert gas to expand the expandable member corresponding to the differential pressure evidencing decreases in the internal pressure relative to the external fuel storage tank pressure, said means for regulating being operably connected to the means for receiving an inert gas, whereby, said expandable member can be reversibly expanded between a substantially relaxed first state and a second state in which the member and the inert gas contained thereby substantially fill the internal volume of the fuel storage tank.

8. The fuel vapor reduction apparatus for a fuel storage tank of claim 7 wherein the means for regulating comprises means for relieving pressure of the vacant volume.

9. The fuel vapor reduction apparatus for a fuel storage tank of claim 8 wherein the means for relieving pressure of the vacant volume is responsive to the internal pressure signal and the external pressure signal, whereby, an increase in the differential pressure between the pressure of the vacant volume and the external fuel storage tank pressure above a first predetermined threshold resulting from an increase in the fuel volume actuates the means for relieving pressure of the vacant volume.

10. The fuel vapor reduction apparatus for a fuel storage tank of claim 8 wherein the means for relieving pressure of the vacant volume is responsive to the internal pressure signal and the external pressure signal, whereby, an increase in the differential pressure between the pressure of the vacant volume and the external fuel storage tank pressure above a first predetermined threshold resulting from a decrease in the external fuel tank pressure actuates the means for relieving pressure of the vacant volume.

11. The fuel vapor reduction apparatus for a fuel storage tank of claim 8 wherein the means for regulating comprises a pressure actuator in operative association with and responsive to the external pressure signal.

12. The fuel vapor reduction apparatus for a fuel storage tank of claim 7 wherein the means for regulating allows inert gas from the means for receiving to be directed to the expandable member when the differential pressure between the vacant volume and the external fuel storage tank pressure exceeds a predetermined threshold below the predetermined differential pressure between the vacant volume and the external fuel storage tank pressure signals.

13. The fuel vapor reduction apparatus for a fuel storage tank of claim 7 wherein the means for regulating is responsive to the internal pressure signal and the external pressure signal, whereby, a decrease in the predetermined differential pressure between the vacant volume and the external fuel storage tank pressure below a predetermined threshold resulting from a decrease in the fuel volume actuates the means for regulating allowing inert gas from the means for receiving to be directed to the expandable member.

14. The fuel vapor reduction apparatus for a fuel storage tank of claim 7 wherein the means for regulating is responsive to the internal pressure signal and the external pressure signal, whereby, a decrease in the predetermined differential pressure between the vacant volume and the external fuel storage tank pressure below a predetermined threshold resulting from an increase in the external fuel storage tank pressure actuates the means for regulating allowing inert gas from the means for receiving to be directed to the expandable member.

15. A method of reducing fuel vapor in a fuel storage tank, having an internal volume substantially including a fuel volume and a vacant volume, which comprises:

a. sensing pressure of the vacant volume and producing an internal pressure signal;

b. sensing external fuel storage tank pressure and producing an external pressure signal;

c. receiving an inert gas by a non-permeable expandable member disposed inside said fuel storage tank between a fuel in the fuel volume and the vacant volume and expanding said expandable member in a manner so as to be able to expandably receive and hold the inert gas; and d. regulating the inert gas received and held by the expandable member in response to at least one of the internal pressure signal by relieving internal pressure corresponding to the internal pressure signal evidencing increases in the internal pressure and by allowing the inert gas to expand the expandable member corresponding to the internal pressure signal evidencing decreases in the internal pressure, and the external pressure signal by relieving internal pressure corresponding to the external pressure signal evidencing decreases in the external pressure and by allowing the inert gas to expand the expandable member corresponding to the external pressure signal evidencing increases in the external pressure, whereby, said expandable member can be expanded between a substantially relaxed first state and a second state in which the member and the inert gas contained thereby substantially fill the internal volume of the fuel storage tank.

16. The method of reducing fuel vapor in a fuel storage tank of claim 15 further comprising containing an inert gas in operable association with the fuel storage tank.

17. The method of reducing fuel vapor in a fuel storage tank of claim 15 further comprising:

a. sensing an increase in the differential pressure between the pressure of the vacant volume and the external fuel storage tank pressure above a first predetermined threshold resulting from at least one of an increase in the fuel volume and a decrease in the external fuel tank pressure; and b. relieving pressure of the vacant volume.

18. The method of reducing fuel vapor in a fuel storage tank of claim 15 further comprising:

a. sensing a decrease in the differential pressure between the vacant volume and the external fuel storage tank pressure below a second predetermined threshold resulting from at least one of a decrease in the fuel volume and an increase in the external fuel storage tank pressure; and b. allowing inert gas from the means for receiving to be directed to the expandable member.

19. A method of reducing fuel vapor in a fuel storage tank, having an internal volume substantially including a fuel volume and a vacant volume, which comprises:

a. sensing pressure of the vacant volume and producing an internal pressure signal corresponding to the pressure of the vacant volume;

b. sensing external fuel storage tank pressure and producing an external pressure signal corresponding to the external fuel storage tank pressure;

c. containing an inert gas in operable association with the fuel storage tank;

d. receiving the inert gas by a non-permeable expandable member disposed inside said fuel storage tank between a fuel in the fuel volume and the vacant volume, said expandable member being in operable association with the fuel storage tank in a manner so as to be able to expandably receive and hold the inert gas;

e. expanding said expandable member between a substantially relaxed first state and a second state in which the member and the inert gas contained thereby substantially fill the internal volume of the fuel storage tank; and f. regulating the inert gas received and held by the expandable member that is responsive to a predetermined differential pressure between the pressure of the vacant volume and the external fuel storage tank pressure, by relieving internal pressure corresponding to the differential pressure evidencing increases in the internal pressure relative to the external fuel storage tank pressure and by allowing the inert gas to expand the expandable member corresponding to the differential pressure evidencing decreases in the internal pressure relative to the external fuel storage tank pressure.

* * * * *